United States Patent [19]

Nagano

[11] Patent Number: 4,768,623
[45] Date of Patent: Sep. 6, 1988

[54] CANTILEVER BRAKE FOR A BICYCLE
[75] Inventor: Masashi Nagano, Izumi, Japan
[73] Assignee: Shimano Industrial Company Limited, Osaka, Japan
[21] Appl. No.: 37,438
[22] Filed: Apr. 13, 1987
[30] Foreign Application Priority Data Apr. 18, 1986 [JP] Japan .................................. 61-59085

[51] Int. Cl.$^4$ .............................................. B62L 1/10
[52] U.S. Cl. ............................ 188/24.12; 188/250 G; 188/250 B; 188/24.21; 188/24.19
[58] Field of Search .................... 188/24.11, 24.22, 26, 188/73.1, 73.2, 250 R, 250 B, 250 G; 192/107 R

[56] References Cited

U.S. PATENT DOCUMENTS

| | | |
|---|---|---|
| 3,732,951 | 5/1973 | Hata et al. ......................... 188/24.13 |
| 4,163,482 | 8/1979 | Lauzier ......................... 188/24.21 X |
| 4,391,353 | 7/1983 | Mathauser ................... 188/24.22 X |
| 4,441,592 | 4/1984 | Everett ....................... 188/250 B X |
| 4,538,707 | 9/1985 | Schoch ............................ 188/24.22 |
| 4,546,858 | 10/1985 | Nagano ...................... 188/24.22 X |
| 4,597,474 | 7/1986 | Nagano ............................ 188/24.21 |

FOREIGN PATENT DOCUMENTS

| | | |
|---|---|---|
| 2447512 | 4/1976 | Fed. Rep. of Germany . |
| 835450 | 12/1938 | France . |
| 892113 | 3/1943 | France .............................. 188/24.19 |
| 963977 | 7/1950 | France . |
| 964404 | 8/1950 | France . |
| 974008 | 2/1951 | France . |
| 1504752 | 10/1967 | France . |
| 963977 | 7/1950 | France . |
| 2405176 | 5/1979 | France . |
| 2531674 | 2/1984 | France . |

Primary Examiner—Douglas C. Butler
Attorney, Agent, or Firm—Stevens, Davis, Miller & Mosher

[57] ABSTRACT

A cantilever brake is provided at the upper portion of each brake shoe with a swollen portion swollen slantwise or obliquely upwardly and away from the upper edge of the braking surface of the break shoe toward a shoe holder holding the brake shoe, to thereby prevent reduction in the braking surface caused by wearing of the brake shoe.

6 Claims, 3 Drawing Sheets

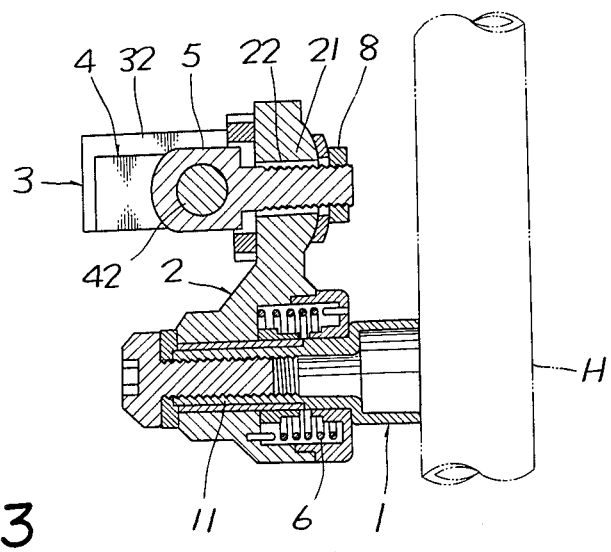
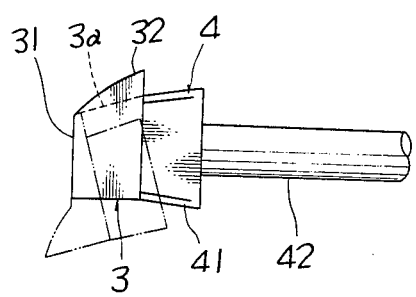
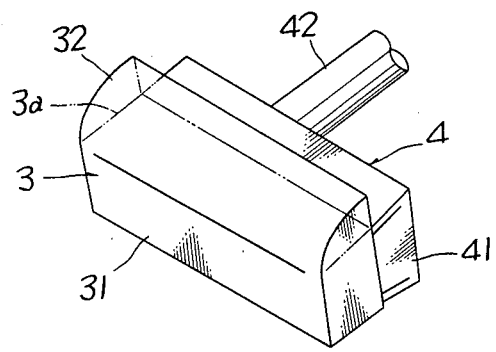
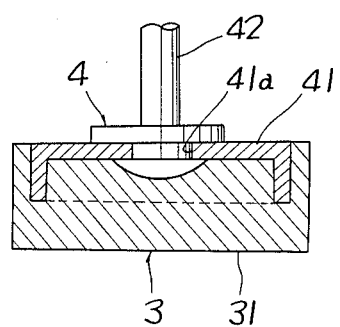

CANTILEVER BRAKE FOR A BICYCLE

FIELD OF THE INVENTION

The present invention relates to a cantilever brake for a bicycle, and more particularly, to a cantilever brake provided with fixing bases and cantilevers supported swingably a fixing base, the cantilevers each having a shoe holding unit above the position where the cantilever is supported to the fixing base, the shoe holding unit holding a brake shoe having a braking surface opposite to a braked surface at a wheel rim.

BACKGROUND OF THE INVENTION

The conventional bicycle cantilever brake is well-known and is constructed as disclosed in, for example, Japanese Utility Model Publication Gazette No. Sho 55-47,740. The conventional centilever brake includes a pair of cantilevers B and bent at intermediate portions thereof and supported rotatably at one of their ends through support shafts K to fixing bases fixed to, for example, a front fork H at the bicycle. A tightening shaft C is inserted into the bent portion of each cantilever B, a shoe holder E carrying a brake shoe D is inserted at a stem S thereof into a through bore formed at the shaft C. A nut tightly screws with a screw thread at the utmost end of tightening shaft C, thereby fixing the shoe holder E thereto. A hanging wire G is mounted at both ends thereof onto free ends F of the cantilevers B, and a control wire W is connected to the center of the hanging wire G through a connector J. In operation, the control wire W is pulled to rotate each cantilever B toward the wheel rim R (in the direction of the arrow X in FIG. 7) around the support shaft K to thereby brake the wheel rim R by the brake shoe D.

In the cantilever brake constructed as described above, the pivot point of the cantilever B, that is, the axis of the support shaft K is near the rim R so that the radius of gyration, when the brake shoe D exerts the braking action, is smaller than that of a rim brake or a caliper brake, whereby the repetition of braking action causes wearing at a rear portion of the braking surface L in the rotation direction of the brake shoe D as shown by the chain line in FIG. 6. As a result, the contact area of the braking surface L and rim R gradually decreases, thereby creating a problem in that the braking effect greatly deteriorates.

Also, the contact area of the braking surface L, when gradually reduced, largely applies the braking effect onto the braking surface to increase wearing of the brake shoe D per unit time, thereby creating a problem in that the durability of brake shoe D deteriorates.

Furthermore, the reduced contact area at the braking surface L causes brake shoe D to shift radially inwardly from the wheel rim R to enter between spokes, thereby creating a problem in that the spoke is occasionally broken.

SUMMARY OF THE INVENTION

In light of the above problems, the present invention has been designed. An object thereof is to provide a cantilever brake wherein the upper portion of each brake shoe includes a swollen portion so that, even when the brake shoe is worn after repetition of the braking action, a large contact area of the braking surface with the braked surface can be ensured, thereby minimizing reduction in the contact area so as to prevent deterioration of the braking effect, reduce the wearing per unit time to improve the durability, and prevent the brake shoe from escaping from the braked surface when exerting the braking action.

In order to attain the above object, the present invention is directed to an improvement in a cantilever brake comprising fixing bases, cantilevers supported swingably thereto and provided above the supporting positions of the cantilevers with shoe holding units, shoe holders held thereby, and brake shoes having the braking surfaces opposite to the braked surface of a wheel rim and held by the shoe holders respectively. The invention is characterized in that at the upper portion of each brake shoe is provided a swollen portion which is swollen slantwise or obliquely upwardly from the upper edge of the braking surface of the brake shoe toward the shoe holder.

Accordingly, even when the repetition of braking action causes wearing at the brake shoe, the contact area of the braking surface with the braked surface can be maintained sufficiently by the swollen portion, to minimize reduction of the contact area so as to prevent deterioration of the braking effect, reduce a wearing amount per unit time so as to improve the durability, and prevent the brake shoe from escaping from the braked surface when exerting the braking action.

These and other objects of the invention will become more apparent in the detailed description and examples which follow.

BRIEF DESCRIPTION OF THE DRAWINGS

FIG. 2 is a longitudinal sectional side view of the FIG. 1 embodiment,

FIG. 3 is an enlarged front view of the principal portion thereof,

FIG. 4 is a perspective view of the principal portion of the same,

FIG. 5 is a cross-sectional view of the same,

DETAILED DESCRIPTION OF THE INVENTION

Figure 1:
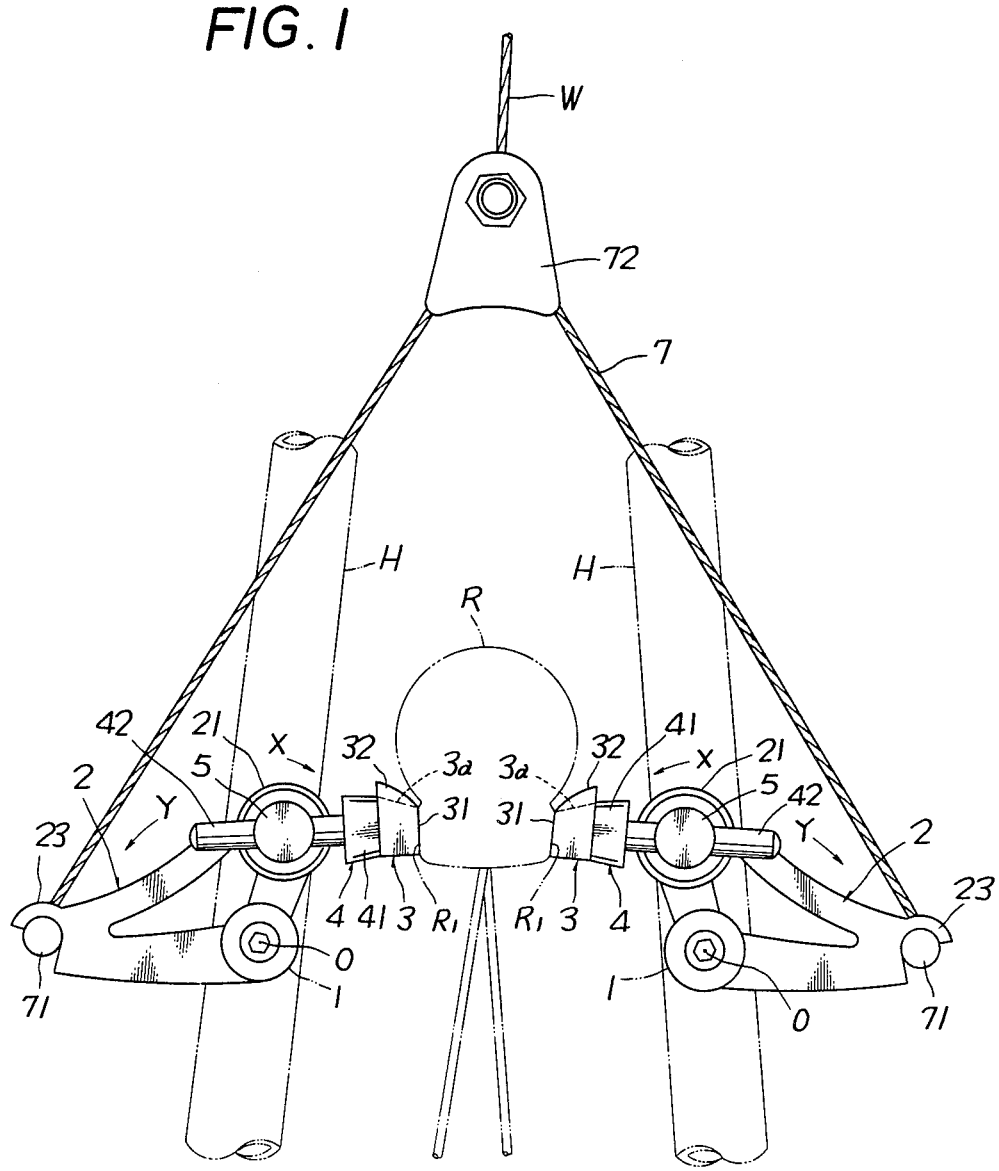
FIG. 1 is a front view of an embodiment of a cantilever brake of the invention.
Figure 6:
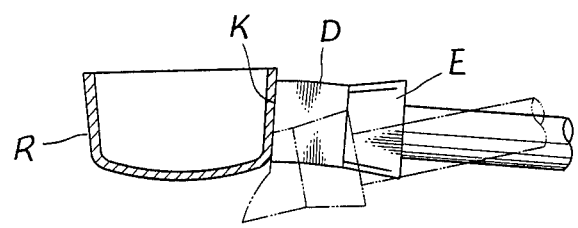
FIG. 6 is a front view exemplary of the conventional brake shoe.
Figure 7:
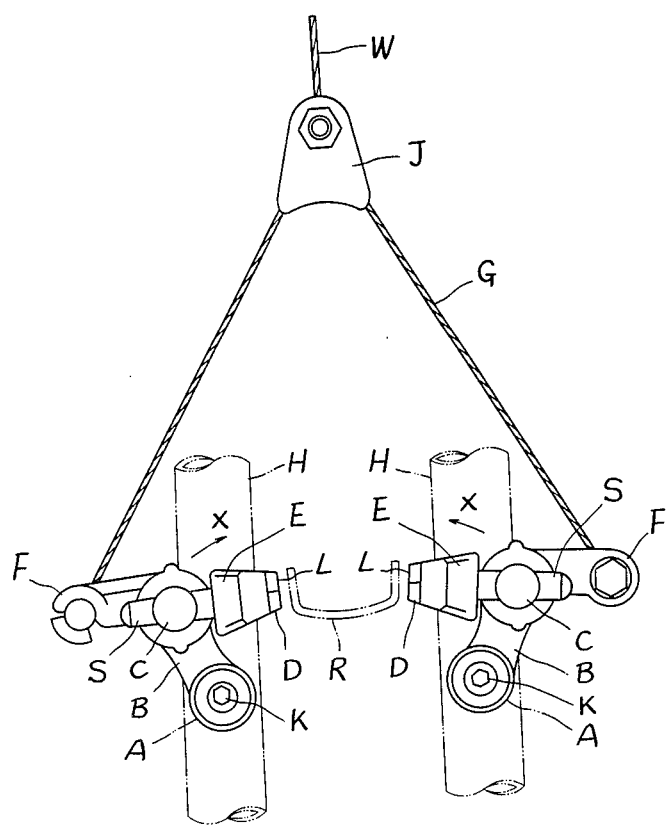
FIG. 7 is a front view exemplary of the conventional cantilever brake.

Referring to FIG. 1, a cantilever brake for braking a front wheel of the bicycle is shown, which comprises a pair of brake units. Each unit is the same in construction and is constructed as follows.

A cantilever 2 is supported swingably to a tubular shaft 11 (in FIG. 2) at a fixing base 1 fixed to a front fork H at the bicycle, and a shoe holding unit 21 is provided at the upper portion of the cantilever 2 with respect to the supporting position thereof to the tubular shaft 11. A brake shoe 3 having a braking surface opposite to the braked surface $R_1$ at a wheel rim R at the bicycle is held to the shoe holding unit 21 through a shoe holder 4 and a tightening shaft 5, and a coiled return spring 6 is interposed between the fixing base 1 and the cantilever 2 as shown in FIG. 2. A hanging wire 7 is mounted on both ends of cantilevers 2 through retainers 71 respectively, and a control wire W connects with the center of the hanging wire 7 through a connector 72, thereby rotating each cantilever 2 against the return spring 6 in the direction of the arrow X in FIG. 1. When the braking action is released, the cantilever 2 is restored by a restoring force of the return spring 6 in the direction of the arrow Y in FIG. 1.

Each cantilever 2, as seen in FIG. 1, comprises a bell crank bent at an intermediate portion thereof and supported rotatably therethrough to the tubular shaft 11. Each cantilever 2 has at one end a holding bore 22, so that the tightening shaft 5 is inserted therein, and a nut 8 screws with the tip of the shaft 5 to thereby mount the brake shoe 3 on the cantilever 2 through the shoe holder 4. Also, the cantilever 2 has at its other end a retaining portion 23 to which a retainer 71 at each end of the hanging wire 7 is supported.

The cantilever brake of the invention constructed as described above, as shown in FIGS. 1 through 4, is provided at the upper portion 3a of each brake shoe 3 with a swollen portion 32 which is swollen slantwise or obliquely upwardly from the upper edge of the braking surface 31 opposite to the braked surface $R_1$ at the wheel rim R toward the shoe holder 4, in other words, in the direction away from the braking surface 31.

The swollen portion 32 is formed along the radius of curvature of a circular arc centered at the fulcrum of the center O of the supporting position of cantilever 2, that is, the axis O of the tubular shaft 11, at a target of the position of brake shoe 3 with respect to the usual wheel rim, thereby compensating a decrease in the contact area of the braking surface 31 with the braked surface $R_1$ due to wearing of the brake shoe 3. In the illustrated embodiment, swollen portion 32 is provided throughout the entire length of the brake shoe 3, but may alternatively be provided thereon except for both lengthwise end portions or an intermediate portion.

Also, the swollen portion 32 may have a flat surface instead of the circular-arc surface as shown.

The shoe holder 4, as shown in FIG. 5, comprises a box-shaped body 41 and a shaft 42 having a flange at one end portion, the shaft 42 being fitted at the one end into the through bore 41a and caulked thereto, thereby integrally coupling the body 41 and shaft 42. Thus, the brake shoe 3 is formed by embedded-molding using the body 41 as a core.

The cantilever brake of the invention constructed as described above rotates the cantilevers 2 in the direction of the arrow X in FIG. 1 by pulling the control wire W to thereby exert the braking action by the brake shoes 3 on the wheel rim R. When the braking action is repeated over a sufficient time interval, the braking surface 31 of each brake shoe 3 is gradually worn, but the swollen portion 31 provided at the upper portion of the brake shoe 3 keeps the contact area almost unchanged in size, thereby minimizing a decrease thereof and preventing deterioration of the braking effect.

Also, since the aforesaid contact area can be maintained sufficiently, the wearing amount per unit time can be reduced, the durability of the brake shoe 3 can be improved and the brake shoe 3 is prevented from escaping from the braked surface $R_1$.

In addition, when the holding bore 22 at the shoe holding unit 21 at the cantilever 2 is made vertically elongated and the shoe holder 4, when the brake shoe 3 is worn, is made upwardly movable, the invention provides the advantage of preventing the braking surface 31 from causing uneven wear.

While a preferred embodiment of the invention has been described using specific terms, such description is for illustrative purpose only, and it is to be understood that changes and variations may be made without departing from the spirit or scope of the following claims.

What is claimed is:

1. A cantilever brake for a bicycle, said brake comprising:
   a fixing base,
   a cantilever supported swingably to said fixing base, said cantilever having a shoe holding unit,
   a shoe holder supported at said shoe holding unit, and
   a brake shoe supported by said shoe holder and having a braking surface adapted to be oriented substantially parallel to and to contact a braked surface of a wheel rim of said bicycle, said brake shoe having an upper surface and a lower surface both adapted to be substantially perpendicular to said braked surface of said wheel rim, said brake shoe having a swollen portion on said upper surface extending beyond an upper extent of said shoe holder, said swollen portion having an upper swollen surface oriented obliquely upwardly away from an upper edge of said braking surface toward said shoe holder, and said upper swollen surface of said swollen portion extending along a circular arc centered at a rotation axis of said brake shoe during braking action.

2. A cantilever brake for a bicycle according to claim 1, wherein said circular-arc is centered at a fulcrum position at which said cantilever is supported to said fixing base.

3. A cantilever brake for a bicycle according to claim 1, wherein said brake shoe is formed integrally with said shoe holder by embedded-molding using said shoe holder as a core.

4. A cantilever brake for a bicycle according to claim 1, wherein said shoe holding unit has an adjusting means for vertically adjusting the position of said shoe holder relative to said shoe holding unit.

5. A cantilever brake for a bicycle according to claim 4, wherein said adjusting means is a vertically elongated slot.

6. A cantilever brake for a bicycle, said brake comprising:
   a fixing base,
   a cantilever supported swingably to said fixing base, said cantilever having a shoe holder unit,
   a shoe holder supported at said shoe holding unit, and
   a brake shoe supported by said shoe holder and having a primary braking surface adapted to be oriented substantially parallel to and to contact a braked surface of a wheel rim of said bicycle, said brake shoe having an upper surface and a lower surface both adapted to be substantially perpendicular to said brake surface of said wheel rim, said brake shoe having a swollen portion on said upper surface, said swollen portion comprising means for providing a large supplemental braking surface contact area for contacting said braked surface after said primary braking surface has become worn after repeated applications of braking action to prevent deterioration of braking effect after said repeated applications and to prevent said brake shoe from slipping off and said braked surface during braking action after said repeated applications.

* * * * *